Sept. 20, 1932. H. L. JOHNSTON 1,878,149
MIXING MACHINE
Filed June 6, 1927 4 Sheets-Sheet 2

INVENTOR.
Herbert L. Johnston
BY Maréchal and Noe
ATTORNEYS.

Sept. 20, 1932.  H. L. JOHNSTON  1,878,149
MIXING MACHINE
Filed June 6, 1927   4 Sheets-Sheet 3
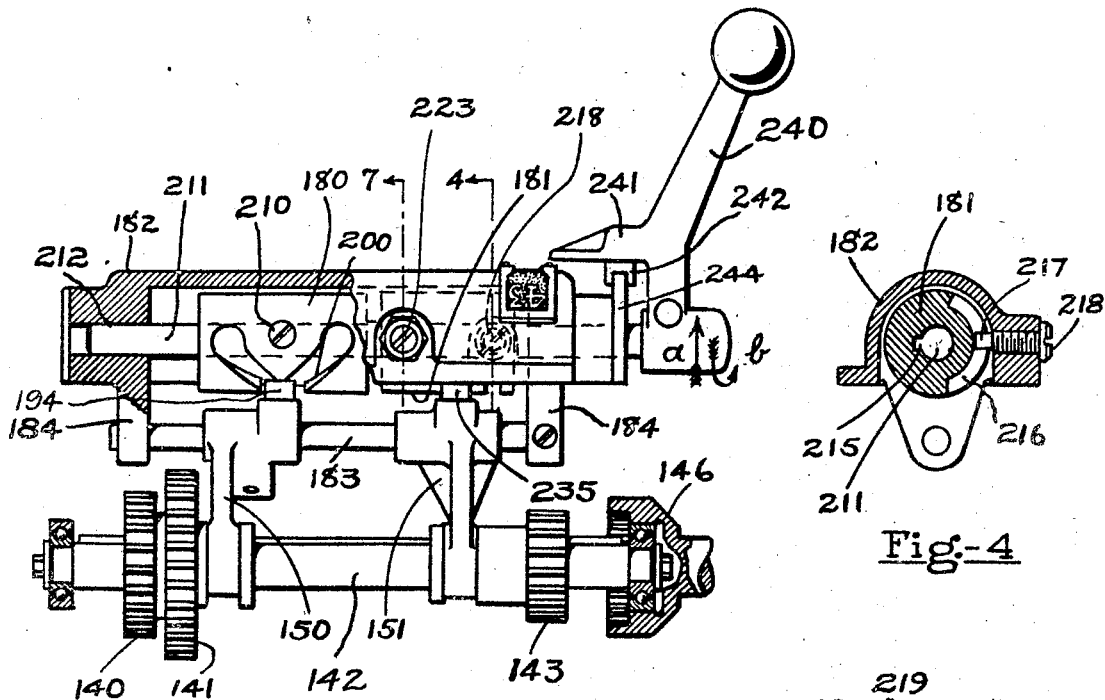
Fig.-4
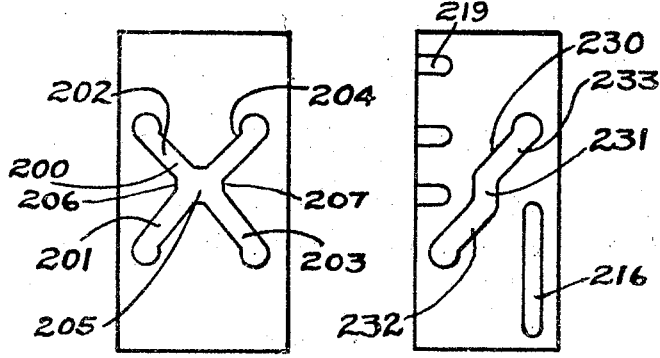
Fig.-3
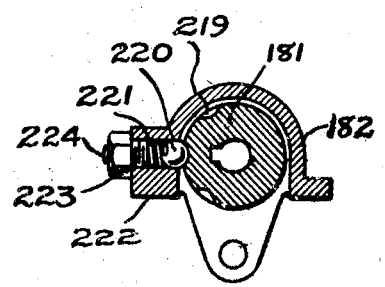
Fig.-5   Fig.-6
Fig.-7
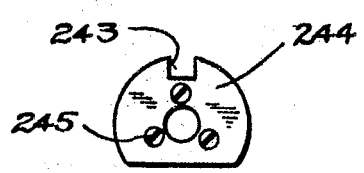
Fig.-8
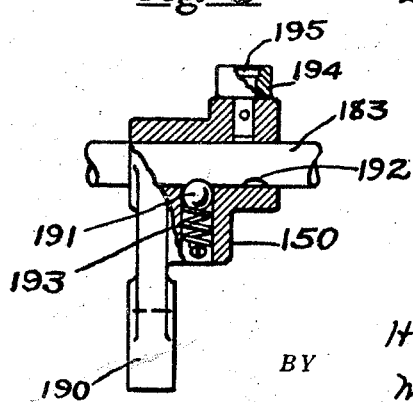
Fig.-9
INVENTOR
Herbert L. Johnston
BY Maréchal and Noe
ATTORNEYS

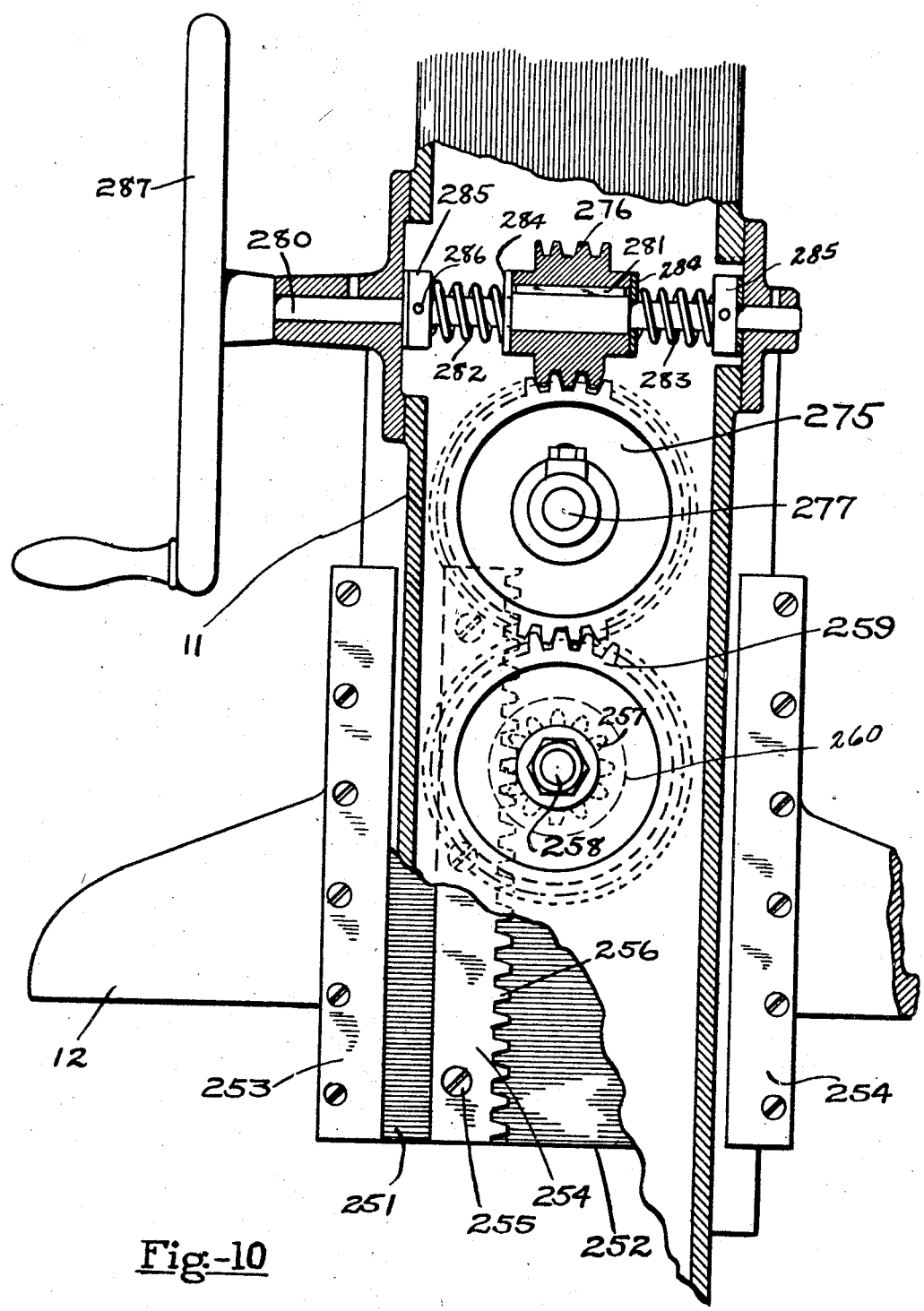

Patented Sept. 20, 1932

1,878,149

UNITED STATES PATENT OFFICE

HERBERT L. JOHNSTON, OF TROY, OHIO, ASSIGNOR TO THE HOBART MANUFACTURING COMPANY, OF TROY, OHIO, A CORPORATION OF OHIO

MIXING MACHINE

Application filed June 6, 1927. Serial No. 196,785.

This invention relates to mixing machines and particularly to machines for mixing foodstuffs such as bread dough and the like.

The primary object of the invention is to provide an efficient and effectively operating mixing machine of this character which is reliable in operation and constructed in a rugged manner so as to be capable of operation with with a minimum of attention.

A further object of the invention is to provide a mixing machine which may be easily operated and controlled by the operator.

Other objects and advantages of this invention will be apparent from the following description when taken in connection with the accompanying drawings.

In the drawings

Fig. 3 is a fragmentary plan view of part of the change-speed operating mechanism;

Fig. 4 is a section on the line 4—4 of Fig. 3;

Fig. 5 is a developed view of one of the change-speed cams;

Fig. 6 is a developed view of the other change-speed cam;

Fig. 7 is a section on the line 7—7 of Fig. 3;

Fig. 8 is a detail view of the gear-shift sector;

Fig. 9 is a detail view of a cam-operated gear-shifting arm partly in section;

Fig. 10 is a vertical section through the supporting pedestal of the machine.

Figure 1:
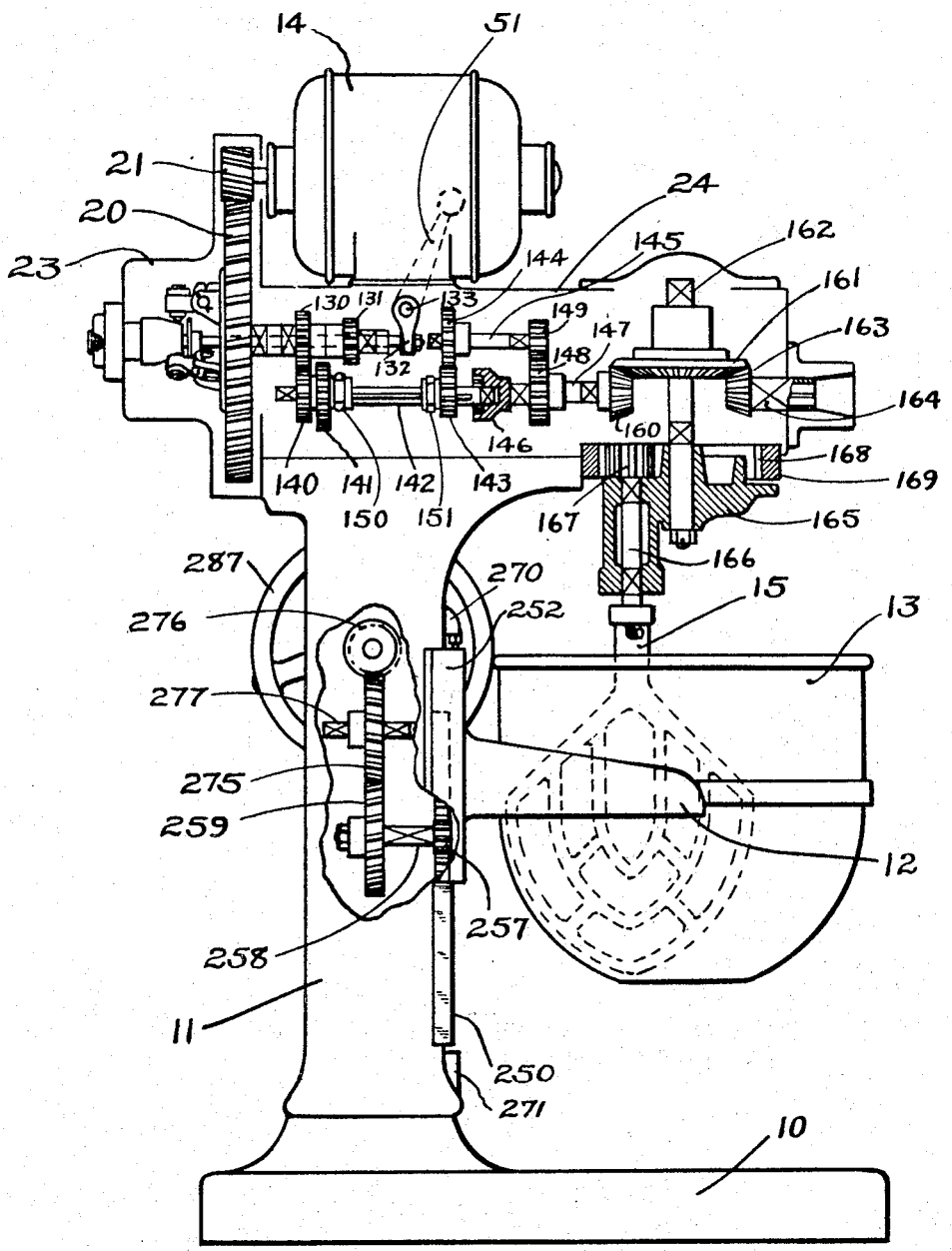
Fig. 1 is a side elevation of a mixing machine partly broken away to represent the driving mechanism.

Referring more particularly to the drawings in which like characters of reference represent corresponding parts in the various figures, the machine is comprised essentially of a base 10 upon which is mounted the supporting pedestal 11 which holds the supporting table 12 in which is mounted the mixing bowl 13. At the upper part of the pedestal is the gearing or transmission mechanism by means of which the electric motor 14 is connected to the revolving mixing arm 15. Suitable operating mechanism is provided by means of which the operator is permitted to control the starting and stopping of the machine and to control the speed of operation thereof.

The motor 14 drives the main gear 20 of the drive mechanism, by means of a drive gear 21 fastened on the motor shaft. The gears 20 and 21 are contained within an end housing 23 which encloses the rear end of the main casing designated generally 24 in which is positioned the transmission mechanism of the machine. The main gear 20 is adapted to be operably connected to and operate the main drive sleeve 30 and is connected thereto by means of the clutch plates 31, which are provided on a recessed portion 32 of the main gear and also on a driven member 33 which is fixed to the main drive sleeve 30. The main drive gear 20 is mounted upon anti-friction bearings of the ball or roller type, designated 34 and 35, so that it is capable of free independent movement about the sleeve 30 when the clutch plates are out of engagement. The various clutch plates are adapted to be engaged by means of a clutch-operating ring 40 which may be pressed inwardly to cause engagement of the clutch plates by means of three pins 41 which pass through a cover 42 fixed in place by the screws 43 which are threaded into the main drive gear 20. The three pins 41 are adapted to be pressed inwardly by means of three bell-crank operating arms 44 which are pivotally mounted on shafts 45 which are suitably held in place upon the cover plate 42. The bell-crank operating arms 44 may thus rotate about the axis of the sleeve 30 along with the clutch assembly in main gear 20, and be maintained in engagement with the pins 41 to maintain the clutch-operating ring against the clutch plates.

Figures 2, 11:
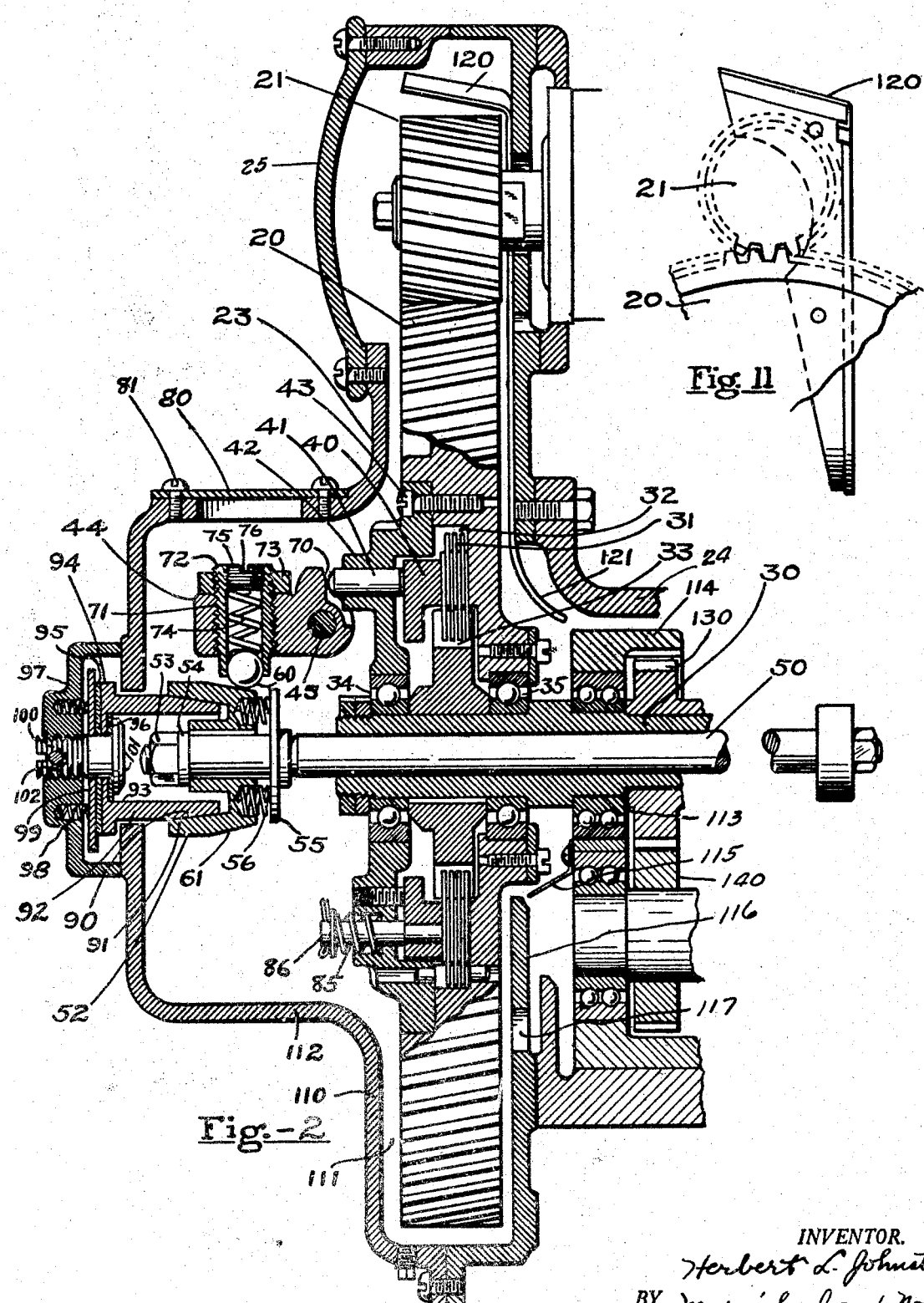
Fig. 2 is a vertical section taken through the gear and clutch casing at the rear of the mixing machine.
Fig. 11 is a detail view of part of the oil conductor.

The bell-crank operating arms 44 are moved about the axes of their pivot shafts 45 by means of the manually-operated rod or shaft 50 which extends through the main drive sleeve 30 and which is keyed thereto but capable of free endwise movement in this sleeve. This shaft 50 is operated back and forth by means of the manually-controlled handle 51 shown in Fig. 1. The shaft 50 is provided at its rear end with a conical part 52 which is keyed on the shaft 50 but capable of limited movement endwise on the shaft. A nut 53 is threaded on the rear end of the shaft 50 and an end collar 54 limits the movement of the conical part 52 on the shaft in one direction. A collar plate 55 is pressed against a stop flange on the shaft 50 and a series of springs 56 press upon one side of the plate 55 so as to maintain the conical part 52 yieldingly held towards the rear of the machine. The conical part 52 is moved to the right or to the left by means of the manually-controlled handle 51 so as to cause the hardened rollers or balls 60 provided in each of the bell-crank arms 44 to ride upon the outer conical surface 61 of the conical part 52. When the operating shaft 50 is moved to the right from the position shown in Fig. 2 the bell-crank arms 44 will be moved so as to press inwardly upon the operating pins and cause the engagement of the clutch.

Each bell-crank arm 44 is provided with a cam surface 70 which engages the outer rounded end of the corresponding operating pin 41. The arm 44 is provided with internal screw threads 71 which receive a threaded bushing or sleeve 72 which is fixed in position on the arm 44 by means of a lock-nut 73. The bushing 72 holds in its hollow interior a compression spring 74 which engages at one end against a threaded plug 75 and at its other end against its hardened ball or roller 60. The outer portion of the sleeve 72 adjacent the ball 60 is slightly restricted in size to prevent the ball 60 from moving out of the end of the sleeve. The screw-threaded plug 75 is provided with a slot 76 by means of which it may be turned so as to put a greater or less pressure upon the spring 74 and consequently upon the ball 60. A cover plate 80 is detachably fastened by screws 81 to the main housing 23 so as to permit easy access to the adjusted threaded plugs 75.

The clutch-operating ring 40 and the operating pins 41 are yieldingly urged outwardly by means of the small springs 85 one end of each of which is engaged in a recess provided for it in the cover plate 42 and the other end engaging a collar on the outer end of a pin 86 which is attached to the clutch-operating ring. The pins 41 are thus maintained in engagement with the operating cam faces 70 of the bell-crank arms while the rollers 60 are maintained in engagement with the conical face 61 of the operating part 52. The springs 74 are sufficiently strong so that they will not be compressed in the normal operation of the clutch until after a predetermined proper force is applied to the clutch plates. The adjustment of the tension of the springs 74 which is accomplished by the turning of the threaded plugs 75 provides for the application of the proper compressive force by the clutch-operating collar in case of wear of the various parts of the mechanism, and also permits the clutch plates to be engaged with a predetermined pressure above which it is impossible to apply, even in case the operating shaft 50 is operated to an extreme position and with extreme force tending to cause engagement of the clutch plates; the various springs 74 then are merely compressed after the proper amount of pressure has been applied to the clutch-operating collar so that the various parts will not be strained.

When the shaft 50 is operated to cause disengagement of the clutch plates by movement of the shaft 50 to the rear of the machine, the main drive sleeve 30 and the driven part of the clutch together with the gearing which is connected to the drive sleeve 30 is inclined to drift by reason of its momentum and by reason of the slight drag in the multiple discs of the clutch. A brake mechanism is therefore provided which is thrown into engagement when the clutch is released and the same motion which releases the clutch also causes engagement of the braking device. For this purpose the inside of the flange of the conical part 52 is provided with a slight tapered surface 90 which neatly fits a correspondingly tapered friction surface 91 provided on a brake cone 92 and comprising essentially the hollow cylindrical portion 93 and the disc-like end 94. The tapered surface 90 of the part 52 fits as a female clutch surface about the corresponding male surface on the conical brake part when the operating shaft 50 has been moved to the rear to cause the disengagement of the clutch. The conical brake part 92 is frictionally held against rotation by means of the two discs of frictional material 95 and 96 which contact respectively with the outside and the inside of the disc-like end 94 of the brake cone. These discs or washers 95 and 96 may be made of any suitable material having a high coefficient of friction. Mounted on the rear of the main gear and clutch housing 23 is a cup-shaped end plate 97 which is recessed to provide sockets for a series of springs 98 which engage and press against a rigid washer 99 so as to maintain the friction disc 95 against the conical part 92. Threaded into the cover plate 97 is a threaded stud 100 having a head 101 against which the friction disc 96 is pressed. It will thus be seen that the head of the stud 100 and the rigid plate 99 together yieldingly maintain the friction discs pressed against opposite sides of the end of the conical part 92 so as to frictionally hold the conical part against rotation, although yieldingly permitting restrained motion of the conical part to the rear. The engagement of the conical tapered interfitting surfaces 90 and 91 when the clutch is released is immediately effective upon the release of the clutch to connect the shaft 50 to the brake so as to restrain the rotation of the shaft 50 and consequently apply braking force to the rotation of the drive sleeve 30, its associated gearing, and the driven clutch member. Jamming of the two interfitting cones together is prevented due to the resilient support of the conical brake part which limits the pressure that can be imposed upon the two cones. The pressure between the cones may be regulated by the positioning of the cone 92, this being accomplished by adjustment of the screw stud 100 which is turned a suitable amount and then held in its proper position by means of a pin passing through the end of the stud and engaging in a slot 102 in the adjacent portion of the cover plate 97.

In order to properly lubricate the various gears without supplying an excessive amount of lubricant to the various clutch part the housing 53 is preferably restricted as shown at 110 at its lower portion where it conforms closely to the shape of the lower part of the main gear 20. A reservoir for a limited amount of lubricant is thus provided at 111 and the normal oil level is so maintained that during operation the teeth of the gear 20 will dip into the oil. Oil is supplied in a restricted manner from the main transmission housing 24 in which the change-speed gears are located. The oil from this main housing finds its way through the ball bearing 113 which is mounted within a partition wall 114 of the main housing, and on which main drive sleeve 30 is mounted. The oil after passing through this ball bearing passes over a deflector or guide 115 which is preferably of restricted dimensions laterally so as to collect only a limited quantity of oil, and then runs down an upwardly extending wall 116 and passes through an opening 117 at its lower portion into the restricted reservoir 111. The oil is then carried by the teeth of the gear 20 up to the teeth of the gear or pinion 21 as the gears are rotated and the teeth surfaces of both of these gears are therefore supplied with a sufficient amount of lubricant. It is undesirable however to supply lubricant in excess to the clutch parts and the other operating parts of the mechanism contained within the housing. Consequently the oil, after being squeezed and squirted out laterally as the teeth of the gears 20 and 21 engage, is guided by an oil deflector 120 which is curved at 121 so as to guide the oil back onto the partition wall 114, where it may mingle with the oil from the main housing, a suitable quantity of oil being separated by the deflector 115 and passed into the space 111. Oil squirted to the left from between the gears 20 and 21 splashes against cover 25 and makes an oil fog which assists in lubrication. Excess oil in the clutch parts leaks out through openings or small passages, chipped or otherwise formed to permit drainage of oil therethrough. Some oil also drains out through the clutch pin passages, etc. The supply of oil to the housing 23 is restricted since only a small flow is measured off by the narrow deflector 115 and as the oil is thus returned after it has been squeezed out from the teeth of the two gears a suitable limited amount of oil may be available at all times in the clutch housing, and yet sufficient lubrication is provided in this manner so that the clutch parts and gears 20 and 21 are properly lubricated.

The main drive sleeve 30 extends through the partition 114 into the main change-speed casing 24 and is there provided with the two gears 130 and 131. The operating shaft 50 which controls the engagement of the clutch extends through this hollow sleeve 30 as shown in Fig. 1 and is engaged by a fork 132 rigid with the lower end of the manually controlled lever 51 suitably mounted at 133 upon a supporting shaft in a convenient accessible place.

The two gears 130 and 131 are adapted to be selectively engaged with the two gears 140 and 141 which are keyed adjacent one end of a counter-shaft 142 upon the other end of which is also keyed a third gear 143 which may either engage with a spur gear 144 on an auxiliary drive shaft 145 or may be engaged with an internal gear 146 on a lay shaft. The shaft 147 bears a gear 148 which meshes with a second gear 149 on the auxiliary shaft 145. The two gears 140 and 141 are adapted to engage with the two gears 130 and 131 in a selective manner so that the speed of the counter-shaft 142 may be changed in relation to the speed of the main drive sleeve 30. The lay shaft 147 is connected either through the gear train 143, 144, 149, and 148 to the counter-shaft 142, or it is connected directly through the direct engagement of the gears 143 and 146 so that the speed of the lay shaft 147 may be varied in relation to the speed of the counter-shaft 142. Consequently four adjustments in speed are provided for the lay shaft 147 in relation to the drive sleeve 30. The two gears 140 and 141 are moved endwise together by a gear-shifting bracket 150 and the gear 143 is moved by a gear-shifting bracket 151 in a manner to be presently described.

The shaft 147 carries at one end a bevel gear 160 which engages with a bevel gear 161 fixed on a vertical stub shaft 162, a second smaller bevel gear 163 being provided on a small stub shaft 164 as shown in Fig. 1. The vertical shaft 162 is rigid at its lower end with a rotatable plate 165 which supports a rotatable shaft 166 so that shaft 166 is carried eccentrically on the plate 165. A gear 167 at the upper end of the shaft 166 is rotated by internal teeth 168 provided on the fixed annular ring 169 of the housing. It is thus apparent that as the various drive shafts of the change-speed transmission mechanism are rotated the mixing arm 15 which is attached to the lower end of the shaft 166 is rotated and also moved bodily about the axis of the vertical shaft 162.

The gear-shift brackets 150 and 151, see Fig. 3, are controlled in a selective manner by the operation of two control cams 180 and 181 which are mounted in a support bracket 182 provided to one side of the shaft 50 and main drive sleeve 30. The two brackets 150 and 151 are slidably mounted upon a shaft 183 which is fastened to extending lugs 184 in the main bracket support 182. As shown more particularly in Fig. 9 the bracket 150 is provided with an extending arm 190 which controls the lateral movement of the two gears 140 and 141 the end of said arm being bifurcated to straddle a space attached to the cluster of gears, 140 and 141. A spring-pressed ball 191 is yieldingly held by spring 193 in engagement with one of a pair of concave depressions 192 in the rod 183 upon which the bracket is mounted. The position of the bracket 150 is thus yieldingly maintained for any of its positions of adjustment. At its upper portion the bracket bears a pin 195 on which is mounted a roller 194 which extends into a cam slot 200, the shape of which is shown developed in Fig. 5. This cam slot as shown has two rearwardly extending guideways 201 and 202 and two forwardly extending guideways 203 and 204. An enlarged central portion for the reception of the roller 194 is shown at 205. The cam 180 is fixed by means of a pin 210 to a supporting shaft 211 which is endwise movable and also rotatable within the journals 212 provided therefor at each end of the bracket 182. Endwise movement of the shaft 211 and cam 180 when the cam is in its neutral position, as shown in Fig. 3 is permitted to only a limited extent so that the roller 194 may be positioned against the rear or forward sides 206 or 207 of the central portion of the cam depression. After having been moved slightly forward or rearward from its central neutral position the shaft and the cam may be rotated together in either direction so as to cause the cam-operated roller 194 to move along one of the guideways 201, 202, 203, or 204, and thus cause a movement of the gear-shifting bracket 150 either to the left as the roller 194 moves in either the guideways 201 or 202, or to the right when it moves in the guideways 203 or 204.

The cam 181 is keyed to the control shaft 211 by means of the keyway 215 but the shaft 211 is permitted to move endwise within the cam while the cam is prevented from moving endwise. This cam is provided with a circular peripheral slot 216 in which engages a pin 217 provided by the inner end of a threaded dog pointed screw 218 which is fixed in place on the bottom of the main bracket 182 which supports the control shaft 211. The cam 181 is provided with a series of three concave depressions 219 within which a ball 220 is adapted to partially engage. The ball is pressed by means of a spring 221 provided in a lug 222 on the main bracket 182. A nut 223 threaded on the outer threaded end of a screw 224 maintains the spring 221 under suitable tension so that the ball 220 yieldingly retains the cam 181 in its various positions of adjustment. The cam 181 is provided with a cam surface or depression 230 which is shown developed in Fig. 6. This depression 230 consists of the central portion 231 and the two side guideways 232 and 233. The cam operated roller 235 provided at the upper end of the controlling bracket 151 is adapted to fit within the depression 230 of the cam 181 so that upon rotational movements of the cam the roller 235 will cause the bracket 151 to move to the right or to the left as the cam is rotated in one direction or the other and as the roller 235 is caused to engage with either the slot or guideway 232 or 233 as the case may be.

The two cams 180 and 181 as previously stated are mounted on the common control shaft 211 which extends parallel to the control rod or shaft 50 of the clutch control mechanism. Fixed to the outer projecting end of the control shaft 211 is a handle or control lever 240, which bears a projecting lug 241 upon which is provided an inwardly extending tongue 242. This tongue may be received within a notch 243 in a plate 244 which is fastened by screws 245 to the end of the main support bracket 182. When the handle 240 is in a position shown in Fig. 3 the tongue 242 is received within the notch 243 of the plate so that rotational movements of the lever and of the control rod 211 are prevented. The control lever and rod may however be moved bodily back and forth a slight amount so as to position the operating roller 194 of control bracket 150 against either the side 206 or 207 of the central portion of the cam depression and at the same time move tongue 242 out of notch 243. When the control shaft 211 is moved to the left, see Fig. 3, a slight amount the control roller 194 engages the part 207 and then upon rotational movements of the control lever 240 in either direction the cam-operated bracket 150 will be caused to move to the right and thus cause the disengaging of the gears 130 and 140 and then cause the engagement of the gears 141 and 131 so as to change the speed of the counter-shaft in relation to the main drive sleeve 30. If the control rod 211 and the control handle 240 are rotated in the direction of the arrows "a" or "b" the cam-operated roller 235 of the control bracket 151 will be moved either to the right to cause the direct engagement of the counter-shaft with the internal gear 146 or to the left to cause the engagement of the gear 143 with the gear 144 on the auxiliary shaft 145. A movement of the control handle 240 to the right instead of to the left and then a rotational movement of this lever in one direction or the other will cause an opposite movement of the control bracket 150 while the movements of the control bracket 151 are governed in the same manner by rotational movements of the shaft 211 regardless of the longitudinal position of the control shaft. It will thus be apparent that four different speeds of rotation are provided for the driven shaft 147 in relation to the driving main sleeve 30.

The mixing arm 15 of the machine extends down so as to mix the foodstuffs contained within the bowl 13. The machine is particularly adapted to mix foodstuffs such as cake dough, bread dough, and other similar materials although it obviously can be used for mixing any desired materials for any other purpose. The mixing bowl 13 is held by the table 12 which is adapted to be vertically adjusted so as to raise or lower the bowl to permit its removal or to adjust the extent to which the mixing arm 15 extends into the bowl. The pedestal 11 is provided with a front flat bearing surface 250 against which bears the rear flat bearing surface 251 of the supporting rack post 252. The rack post has side portions 253 which extend around the sides of the bearing surface 250 of the pedestal. The upper portion of the rack post forms a close engagement throughout its transverse extent with the front surface 250 so that food particles or other materials being mixed will not be permitted to get between the rack post 252 and the bearing surface 250. The rack post carries a vertical rack 254 which is attached by means of the screws 255 and which is provided with inwardly projecting teeth 256 adapted to engage with the teeth of a pinion 257 mounted on a shaft 258 extending through the pedestal and bearing a gear 259 in the interior of the hollow pedestal 11. The shaft 258 is mounted in suitable bearings in the pedestal and the pinion 257 is located in an open space 260 in the bearing surface 250 of the pedestal. The pedestal bearing surface 250 is therefore enclosed on the top and sides by the rack post 252 so that in case of splashing of the material being operated upon in the bowl there would be no tendency for these splashes to find their way into the inside of the pedestal and to cause a foul or unsanitary condition to exist.

The upward and downward movement of the rack post 252 is limited at its upper and lower limits of movement by the limiting stops or lugs 270 and 271 provided at the upper and lower portions of the pedestal in the path of movement of the upper and lower portions of the rack post 252. The vertical movement of the rack post and the bowl-supporting table is accomplished by rotation of the pinion 257 which is operated by the gear 259 meshing with the idler gear 275 which serves as a worm-wheel and is adapted to be operated by means of the worm 276 above it. The idler gear 275 is mounted upon a shaft 277 fixed on the pedestal in any suitable manner and the worm 276 which engages this idler gear causes the rotation of the gear train to elevate or depress the bowl. The worm 276 is keyed on the control shaft 280 by means of the key 281 but is otherwise free to move longitudinally along the shaft except as restrained by the two springs 282 and 283 each of which engages at one side with a collar 284 mounted freely on the shaft 280 in contact with a shoulder on the gear and at its other end with the fixed collar 285 which is fixed to the shaft 280 by means of a pin 286. The springs 282 and 283 thus maintain the worm 276 in a normal central position on the shaft 280 and these springs are sufficiently strong so that the worm 276 is maintained in a substantially central position between the sides of the pillar and in engagement with the idler gear 275 as the control shaft 280 is manipulated in a normal manner by means of the manually operable hand-wheel 287. This hand-wheel is located on the side of the machine where it can be easily adjusted by the operator for the purpose of rotating the gear train to elevate and depress the bowl.

Although the springs 282 and 283 which center the worm 276 and normally maintain it in engagement with the idler gear 275 are sufficiently strong to prevent excessive endwise movement of the worm 276 during the normal raising or lowering of the bowl, they are adapted to yield when the bowl has been raised to its upper or lowered to its lowermost level and abuts against the stops 270 or 271. In case the operator continues to apply force to the control wheel 287 after the rack post 252 has come into engagement with one or the other of the limiting stops the springs 282 and 283 will permit the operator to continue to rotate the hand-wheel 287 against ever increasing pressure of these springs without jamming the gear train and without further jamming the supporting rack post against the limiting stops. The increasing resistance on the hand-wheel by reason of the compression of one of the springs 282 and 283 will immediately notify the operator that he should stop the rotation of the hand-wheel. However, if he continues to rotate the hand-wheel the worm 276 will merely move endwise along the shaft 280 without causing any rotation of the gear train with which it is engaged.

It will now be apparent that the machine which has herein been set forth is capable of efficient and effective operation and will be readily maintained in operating condition with a minimum of attention. The materials to be mixed are placed in the bowl which is then raised by operation of the hand-wheel 287 until the rack post 252 engages the limiting stop 270 when the mixing arm 15 will be in its proper position with the bowl. The electric motor 14 being set in operation will rotate the gear 21 thus causing rotation of the large drive gear 20, see Fig. 2. Operation of the clutch-controlled handle 51 will then operate the rod 50 to engage the clutch faces and cause the rotation of the main drive shaft 30. The hand-controlled gear-shift lever 240 which is mounted adjacent to the control handle 51 may then be operated into any one of its four selective positions to cause the proper rotational speed of the mixing arm 15. After the mixture has been stirred up and mixed together as much as desired the clutch may be disengaged by operation of the hand lever 51 and this disengagement will also immediately apply the resistance of the braking friction cone so as to stop rotation of the moving parts of the apparatus.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a device of the class described, a power-transmission system comprising a driving member, a driven member, a clutch between said members, and mechanism for operating said clutch comprising an operating device, means mounted on one of said members so as to be operated by said device to operate said clutch, and wear-compensating mechanism embodied in said means, said wear-compensating mechanism comprising a spring pressed contact member for producing engagement of said clutch, and means for adjusting the tension on said spring.

2. In a device of the class described a clutch operating member, a pair of clutch members, a pivoted means operated by said operating member to control said clutch members, a spring in said pivoted means, a contact member resiliently held in said pivoted means by said spring, said spring transmitting force without deformation to said contact member to cause the normal engagement of said clutch members but adapted to deform under excessive pressures to prevent excessive pressures on said clutch members.

3. In a device of the class described, an operated clutch member, an operating clutch member, a bell-crank arm controlling the engagement of said clutch members, and yieldable means in said arm for preventing excessive forces being transmitted to said clutch members.

4. In a device of the class described, a friction brake comprising a rotatable member, friction restraining means for said member for governing the rotation of said member, means engageable with said member the rotation of which is controlled by said friction brake, and means for resiliently supporting said member for endwise movement.

5. In a device of the class described, a friction brake device comprising a rotatable member having an end portion, friction material on each side of said end portion, a fixed abutment member, and spring means normally pressing said end portion and said friction material together.

6. In a device of the class described, a friction brake device comprising a rotatable means the rotation of which is to be controlled, mechanism for moving part of said means endwise, a rotatable member engageable with said means, means for resiliently supporting said member against endwise movement, and means for frictionally controlling the rotation of said member, said member comprising a hollow cylindrical part, having a conical surface thereon engageable with the corresponding surface on said means.

7. In a machine of the class described, a driving means, a driven rotary hollow sleeve member, means interconnecting said driving means and said driven hollow sleeve member including a clutch, an operating rod extending through said hollow sleeve member and connected for rotation therewith but axially movable with respect thereto, a combined clutch operating and braking member carried by said operating rod, a braking device, and means for axially shifting said operating rod to thereby move said clutch operating and braking member out of clutch engaging position and then into effective engagement with said braking device.

8. In a machine of the class described, an outer rotary member, an inner concentric rotary member, said outer member being rotatably mounted on said inner member, a friction clutch plate carried by said outer member, a friction clutch plate carried by said inner member, said respective clutch plates being in alignment with said outer and inner members and positioned substantially centrally of the width of said outer member, and movable means carried by one of said members for effecting engagement and disengagement of said clutch means.

9. In a machine of the class described, an outer rotary gear, an inner concentric rotary member, said gear being rotatably mounted with respect to said inner member, said gear having an inner cutaway portion surrounding said inner member, a friction clutch plate carried by said gear within said cutaway portion, a friction clutch plate carried by said inner rotary member in cooperative relationship with said first mentioned clutch plate, said respective clutch plates being positioned substantially centrally of the width of said gear, to thereby eliminate side strains upon said gear upon the engagement of said clutch plates.

10. In a machine of the class described, an outer rotary gear, an inner concentric rotary member, said gear being rotatably mounted with respect to said inner member, said gear having a cutaway portion surrounding said inner member, friction clutch means carried by said gear within said cutaway portion, friction clutch means carried by said inner rotary member in cooperative relationship with said first mentioned clutch means, a face plate fastened to said gear over said cutaway portion, and bearings between said gear and said inner rotary member and between said face plate and said inner rotary member, said clutch means being positioned intermediate said bearings.

11. In a machine of the class described, an outer rotary gear, an inner concentric rotary member, said gear being rotatably mounted with respect to said inner member, said gear having a cutaway portion surrounding said inner member, friction clutch means carried by said gear within said cutaway portion, friction clutch means carried by said inner rotary member in cooperative relationship with said first mentioned clutch means, an annular member carried by said gear within said cutaway portion for rotation therewith, said annular member being axially movable with respect to said gear for causing engagement and disengagement of said clutch means, and a member movably mounted on said gear for effecting axial movement of said annular member.

12. In a machine of the class described, an outer rotary gear, an inner concentric rotary member, said gear being rotatably mounted with respect to said inner member, said gear having an inner cutaway portion surrounding said inner member, friction clutch means carried by said gear within said cutaway portion, friction clutch means carried by said inner rotary member in cooperative relationship with said first mentioned clutch means, a face plate fastened to said gear over said cutaway portion, bearings between said gear and said inner rotary member and between said face plate and said inner rotary member, said clutch means being positioned intermediate said bearings, an annular member carried by said face plate within said hollow portion for rotation therewith, said annular member being axially movable with respect to said face plate and gear for causing engagement and disengagement of said clutch, a plurality of members pivotally mounted at spaced points on said face plate and gear, pins slidably mounted with respect to said face plate and gear and operatively connecting said annular member and said pivoted members, and means for controlling the positions of said pivoted members.

13. In a machine of the class described, an outer rotary gear, an inner concentric rotary hollow member, said gear being rotatably mounted with respect to said inner member, friction clutch means carried by said gear, friction clutch means carried by said inner rotary member in cooperative relationship with said first mentioned clutch means, an annular member carried by said gear for rotation therewith, said annular member being axially movable with respect to said gear for causing engagement and disengagement of said clutch means, a plurality of members pivotally mounted at spaced points on said gear for effecting axial movement of said annular member, and an actuating member extending through said inner hollow member and connected to said inner member to rotate therewith, said actuating member being axially movable with respect to said inner member to control the positions of said pivoted members.

14. In a machine of the class described, an outer rotary gear, an inner concentric rotary member, said gear being rotatably mounted with respect to said inner member, friction clutch means carried by said gear, friction clutch means carried by said inner rotary member in cooperative relationship with said first mentioned clutch means, an annular member carried by said gear for rotation therewith, said annular member being axially movable with respect to said gear for causing engagement and disengagement of said clutch, a plurality of members pivotally mounted at spaced points on said gear for effecting axial movement of said annular member, an actuating member connected to said inner member to rotate therewith, a device carried by said actuating member for controlling the positions of said pivoted members, and a brake cooperating with said device for retarding the movement of said inner member.

15. In a machine of the class described, an outer rotary gear, an inner concentric rotary member, said gear being rotatably mounted with respect to said inner member, said gear having an inner cutaway portion surrounding said inner member, friction clutch means carried by said gear within said cutaway portion, friction clutch means carried by said inner rotary member in cooperative relationship with said first mentioned clutch means, a face plate fastened to said gear over said cutaway portion, bearings between said gear and said inner rotary member and between said face plate and said inner rotary member, said clutch means being positioned intermediate said bearings, an annular member carried by said face plate within said hollow portion for rotation therewith, said annular member being axially movable with respect to said face plate and gear for causing engagement and disengagement of said clutch means, a plurality of members pivotally mounted at spaced points on said face plate, pins slidably mounted within said face plate and operatively connecting said annular member and said pivoted members, an actuating member connected to said inner member to rotate therewith, a device carried by said actuating member for controlling the positions of said pivoted members, and a brake cooperating with said device for retarding the movement of said inner member.

16. In a machine of the class described, a driving member, a driven member, a brake cooperating with said driven member, a resilient mounting for said driven member with respect to said brake, and a resilient mounting for said brake.

17. In a machine of the class described, a driving member, a driven member having a brake engaging portion rotatable therewith, a brake cooperating with said portion, a resilient mounting for said brake engaging portion on said driven member urging said portion toward engagement with said brake, and a resilient mounting for said brake urging the same toward engagement with said brake engaging portion.

18. In a machine of the class described, a driving member, a driven rotary member, a brake cooperating with said driven member, a mounting for said brake providing for rotation thereof when engaged by said driven rotary member, and friction means for resisting rotation of said brake.

19. In a machine of the class described, a driving member, a driven rotary member, a brake cooperating with said driven member, a mounting for said brake providing for rotation thereof when engaged by said driven rotary member, friction means for resisting rotation of said brake, spring means for resiliently urging said friction means into engagement with said brake, and means for adjusting the tension of said spring means.

20. In a machine of the class described having a frame, a hollow member rotatably mounted in said frame, said hollow member having an end projecting beyond said frame, an outer rotary member surrounding and concentric with the projecting end of said hollow rotary member, bearing means carried by said hollow member for rotatably supporting said outer member on the projecting end of said hollow member, a clutch for interconnecting said hollow member and said outer rotary member so that the said members rotate together without relative movement with respect to said bearing means, and an actuating rod extending through said hollow member and protruding from the extending end thereof for controlling said clutch.

21. In a machine of the class described having a frame, a hollow rotary sleeve member rotatably mounted in bearings in said frame, said sleeve member having an end projecting beyond said frame, a rotary gear surrounding and concentric with the projecting end of said sleeve member, spaced bearings for rotatably supporting said gear on the projecting end of said hollow sleeve member, a friction clutch for interconnecting said gear and said hollow sleeve member, said friction clutch being mounted intermediate said spaced bearings, movable means for controlling the engagement and disengagement of said friction clutch, and an actuating rod extending through said hollow sleeve member and protruding from the extended end thereof for effecting movement of said movable means.

22. In a device of the class described, a drive mechanism comprising a gear, a clutch face on said gear, a hollow rotary member carrying clutch means adapted to be clutched to said clutch face, axially movable means within said hollow rotary member for controlling engagement and disengagement of said rotary member with said clutch face, and a braking device adapted to be operatively connected in braking engagement with said movable means after a predetermined axial movement of said movable means in a direction to disengage the clutch means carried by said rotary member from said clutch face.

23. In a device of the class described, a driving member including a gear having a clutch face, a driven member including a rotary hollow shaft mounted within said gear and providing a bearing therefor, said rotary hollow shaft carrying a clutch face cooperating with said first mentioned clutch face, means for engaging said clutch faces, and a central rod for operating said last mentioned means, said rod being concentrically mounted within and extending through said members.

In testimony whereof I hereto affix my signature.

HERBERT L. JOHNSTON.